US008670666B2

(12) United States Patent
Pastorelli et al.

(10) Patent No.: US 8,670,666 B2
(45) Date of Patent: Mar. 11, 2014

(54) CHANNEL VALIDATION IN OPTICAL NETWORKS USING MULTI-CHANNEL IMPAIRMENT EVALUATION

(75) Inventors: Rosanna Pastorelli, Melegnano (IT); Stefano Piciaccia, Milan (IT); Alberto Tanzi, Trezzano sul Naviglio (IT); Eliana Silvia Vercelli, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 1321 days.

(21) Appl. No.: 12/430,902

(22) Filed: Apr. 28, 2009

(65) Prior Publication Data

US 2010/0272434 A1 Oct. 28, 2010

(51) Int. Cl.
*H04J 14/00* (2006.01)
*H04B 10/08* (2011.01)

(52) U.S. Cl.
USPC .............................................. 398/57; 398/25

(58) Field of Classification Search
USPC .............................................. 398/57, 25, 26
See application file for complete search history.

(56) References Cited

U.S. PATENT DOCUMENTS

| 6,607,311 B1* | 8/2003 | Fishman et al. ................. 398/79 |
| 2002/0191247 A1 | 12/2002 | Lu et al. |
| 2003/0142293 A1 | 7/2003 | Wight et al. |
| 2003/0161632 A1* | 8/2003 | Wang .............................. 398/48 |
| 2004/0175187 A1 | 9/2004 | Eiselt et al. |
| 2004/0190900 A1* | 9/2004 | Yagyu ............................. 398/57 |
| 2004/0197103 A1 | 10/2004 | Roberts et al. |
| 2008/0080473 A1 | 4/2008 | Thubert et al. |
| 2008/0095058 A1 | 4/2008 | Dalmases et al. |
| 2009/0116833 A1* | 5/2009 | Shimizu et al. .................. 398/2 |
| 2009/0269061 A1* | 10/2009 | Bardalai et al. ................. 398/58 |
| 2009/0269065 A1* | 10/2009 | Bardalai et al. ................. 398/79 |

\* cited by examiner

*Primary Examiner* — Daniel Dobson

(57) ABSTRACT

In an optical communication network that includes a plurality of interconnected network nodes, a method includes storing in each network node one or more cross-talk margins of respective communication channels that traverse the node. A potential communication channel that traverses a subset of the nodes in the network is identified. A quality of the potential communication channel is evaluated by processing the cross-talk margins stored in the nodes in the subset.

22 Claims, 4 Drawing Sheets

CHANNEL VALIDATION IN OPTICAL NETWORKS USING MULTI-CHANNEL IMPAIRMENT EVALUATION

FIELD OF THE INVENTION

The present invention relates generally to communication networks, and particularly to methods and systems for establishing communication paths in optical communication networks.

BACKGROUND OF THE INVENTION

Some optical communication networks employ Wavelength Division Multiplexing (WDM) techniques, which multiplex multiple optical carriers having different wavelengths over a single optical fiber. A variant of WDM, which is referred to as Dense WDM (DWDM), typically operates in the 1550 nm region of the infrared spectrum. Some DWDM networks are configured in mesh topologies.

The present invention will be more fully understood from the following detailed description of the embodiments thereof, taken together with the drawings in which:

DESCRIPTION OF EXAMPLE EMBODIMENTS

Overview

Figure 1:
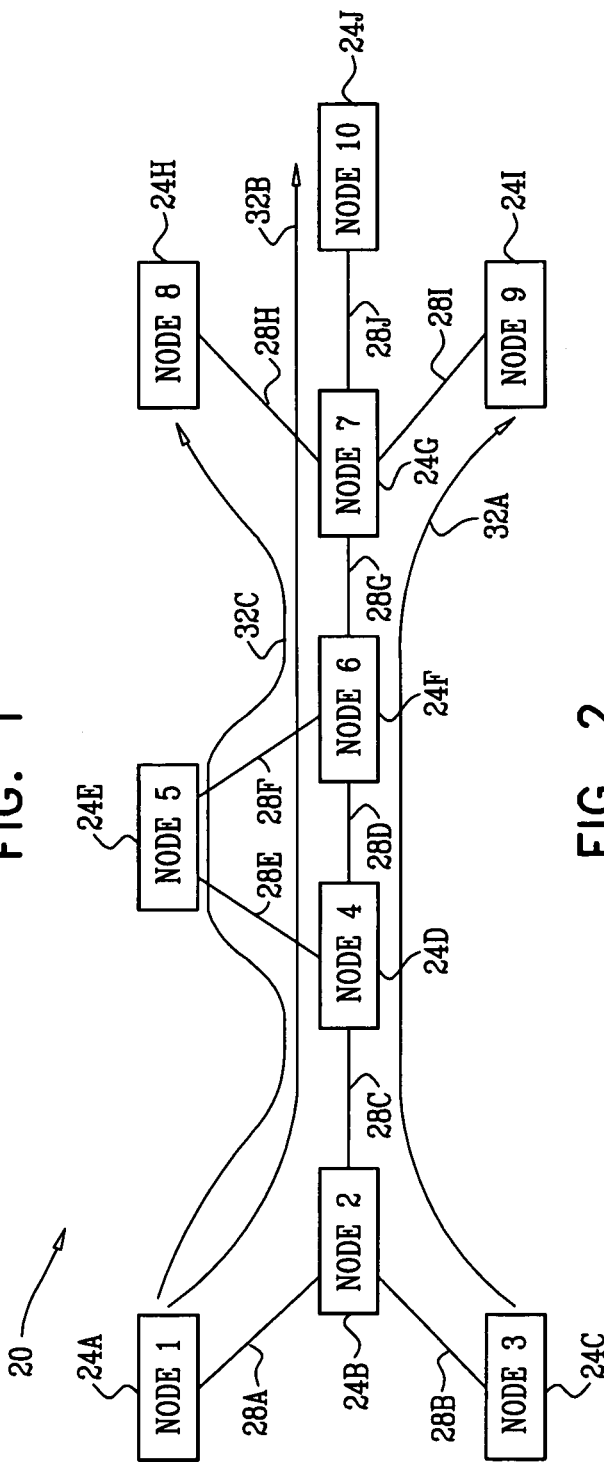
FIG. 1 is a block diagram that schematically illustrates an optical communication network, in accordance with an embodiment of the present invention.

Optical communication networks typically comprise multiple network nodes that are interconnected by optical fiber sections. The performance of optical channels traversing an optical network is affected by various kinds of optical impairments. Some optical impairments affect only a given channel and can be fully characterized using characteristics of this channel. These impairments are referred to herein as single-channel impairments. Other impairments, referred to herein as multi-channel impairments, cause a given channel to affect, or be affected by, one or more other channels in the network. Multi-channel impairments may comprise, for example, non-linear effects in optical fiber sections and/or finite channel isolation in optical components of network nodes.

When multi-channel impairments are present, the performance of a given channel depends not only on the channel in question, but also on other channels that share its optical path through the network. In particular, the feasibility of a certain optical path for establishing a new channel may depend on existing channels. Since the configuration of channels in the network ("the traffic matrix") changes over time, the feasibility of a given path may change over time, as well.

Embodiments of the present invention that are described herein provide methods and systems for validating optical paths for communication channels in an optical network. When validating an optical path for a certain communication channel, the methods and systems described herein take into account (1) the single-channel impairments that affect the feasibility of the validated channel, (2) the effect of existing channels on the validated channel due to multi-channel impairments, and (3) the effect of the validated channel on existing channels due to multi-channel impairments.

The methods and systems described herein translate the different single- and multi-channel effects on a given channel into one or more impairment margins, e.g., cross-talk margin. The impairment margin of a given channel measures the amount of additional impairment of a given type that the channel can tolerate, while still meeting its specified performance. Specifically, the cross-talk margin of a given channel measures the amount of additional cross-talk that the channel can tolerate. Other sorts of impairment margins may comprise, for example, Optical Signal-to-Noise Ratio (OSNR) margins, Polarization Mode Dispersion (PMD) margins and/or filtering margins.

In some embodiments, each network node comprises a local database, which holds up-to-date impairment margin (e.g., cross-talk margin) values of the different channels that traverse the node. A given node may hold multiple types of impairment margins. When two channels traverse a common network node, the effect of one channel on the other can be represented as a decrease in the other channel's impairment margins, which are stored locally at the node. Using this mechanism, the network nodes validate an optical path for a communication channel by evaluating the expected performance of the channel, as well as its effect on other channels, using the impairment margins stored in the network nodes along the path.

In some embodiments, the network nodes validate paths for communication channels using a signaling protocol, which propagates and distributes the impairment margins of the different channels across the network. In one disclosed method, a new channel is to be established from a source node to a destination node along a proposed optical path. The source node sends a path request message to the destination node along the proposed path. The network nodes along the path relay the message toward the destination node, and each node adds its local section characteristics to the message. When the message reaches the destination node, it contains sufficient information for the destination node to assess the expected impairment margin of the new channel, considering also the effects to and from existing channels.

If the proposed path is found to be feasible for the new channel, the destination node sends a path reservation message back to the source node along the path. The path reservation message comprises, among other attributes, the impairment margin of the new channel as calculated by the destination node. Upon receiving this reservation message, each node along the path reserves appropriate resources to the new channel, and updates the impairment margin of the new channel in its local database. Each node also updates the impairment margin of any existing channel that is affected by the new channel. This update is in turn propagated to the other nodes along the path of the existing channel. Such a signaling protocol can be viewed as an "optical control plane," using which channels and paths can be validated in a distributed manner, considering both single-channel and multi-channel effects.

The disclosed methods and systems enable optical networks to validate communication channels, while taking into account multi-channel effects and changes in traffic patterns that occur over time. As a result, better channel routing and better Quality of Service (QoS) can be achieved.

In the embodiments described herein, the proposed path is evaluated based on information that is collected in the different path sections and evaluated collectively for the entire path. In alternative embodiments, however, evaluation can be performed section by section. For example, some types of impairments (e.g., signal-to-noise ratio) can be regarded as irrecoverable. Irrecoverable impairments can only remain unchanged or deteriorate along the path. In other words, if such an impairment reaches an intolerable value in a given path section, it cannot be improved to a tolerable value in a subsequent section of the path. For these sorts of impairments, path evaluation can be performed section by section, and the proposed path can be declared unfeasible as soon as the impairment level is found to be intolerable in a given section. Although the embodiments described herein refer to cross-talk margins, the principles of the present invention can be applied in a similar manner to various other types of impairment margins, such as Optical Signal-to-Noise Ratio (OSNR) margin, Polarization Mode Dispersion (PMD) margin and/or filtering margin.

System Description

FIG. 1 is a block diagram that schematically illustrates an optical communication network 20, in accordance with an embodiment of the present invention. Network 20 comprises multiple nodes 24, such as optical switches. The nodes are also referred to as network elements. In the present example, network 20 comprises ten nodes 24A . . . 24J, respectively denoted Node 1-Node 10. The network nodes are connected to one another using network sections 28, which are also referred to as network spans. In the present example, network 20 comprises ten sections 28A . . . 28J. Each section typically comprises an optical fiber.

A given node communicates over a given section by transmitting multiple optical carriers having different wavelengths. In the present example, network 20 comprises a Dense Wavelength Division Multiplexing (DWDM) network, which operates in the 1550 nm spectrum. Alternatively, however, the methods and systems described herein can be used with any other suitable type of optical communication network, such as Coarse Wavelength Division Multiplexing (CWDM) networks. Moreover, the disclosed techniques can be applied in any other suitable type of network in which the impairments can be characterized using impairment margins, such as various radio networks.

Network 20 provides communication services to end users (not shown in the figures), which are connected to the network nodes using suitable client interfaces. In order to provide these services, multiple communication channels are established via the network. Methods for validating and establishing such communication channels are described in detail further below. For example, FIG. 1 shows three channels 32A . . . 32C. Each communication channel originates at a certain node, which is referred to as a source node, traverses a certain path through the network, and terminates at a certain node, which is referred to as a destination node. In general, a certain network node may serve as a source node of a given channel, as a destination node of another channel, and as an intermediate node along the path of yet another channel.

In some embodiments, network 20 communicates using a Multi-Protocol Label Switching (MPLS) or Generalized MPLS (GMPLS) protocol, and the communication channels comprise MPLS Label Switched Paths (LSPs). MPLS is described, for example, by Rosen et al., in Request for Comments (RFC) 3031 of the Internet Engineering Task Force (IETF), entitled "Multiprotocol Label Switching Architecture," January, 2001, which is incorporated herein by reference. GMPLS is described, for example, by Mannie in IETF RFC 3945, entitled "Generalized Multi-Protocol Label Switching (GMPLS) Architecture," October, 2004, which is incorporated herein by reference. Alternatively, however, the communication channels established in network 20 may use any other suitable standard or protocol. The description that follows refers mainly to unidirectional channels, and bidirectional channels are viewed as pairs of unidirectional channels having opposite directions.

Figure 2:
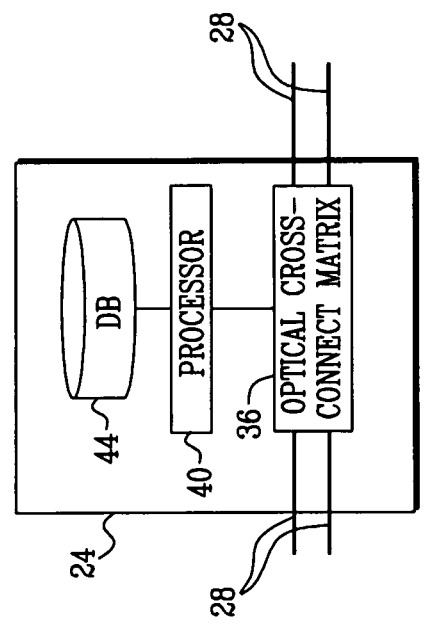
FIG. 2 is a block diagram that schematically illustrates a network node in an optical communication network, in accordance with an embodiment of the present invention.

FIG. 2 is a block diagram that schematically illustrates an example of node 24 in network 20, in accordance with an embodiment of the present invention. Node 24 comprises an optical cross-connect matrix (OXC) 36, which is coupled to sections (optical fibers) 28 that connect node 24 to other nodes of network 20. OXC 36 is configurable to switch optical carriers from one section 28 to another. In other words, the OXC can be configured to switch a given optical carrier entering the node on a given section, so that this carrier will exit the node on another section. (Generally, the disclosed techniques can be applied in various other types of network nodes, without necessarily involving OXC and/or add/drop capabilities, such as for example in line amplifiers.)

Typically, the wavelength of the optical carrier is preserved when passing through the OXC, i.e., the OXC can switch the carrier to exit on a certain desired section, but cannot change its wavelength. Network 20 can thus establish a communication channel to traverse a given path through the network by assigning a certain wavelength to the channel, and then configuring the OXCs of the nodes along the path to switch this wavelength from the previous node along the path to the next node along the path. Thus, the OXC of each node is configured in accordance with a certain routing plan, which specifies how each communication channel traversing the node is to be routed.

Each node comprises a processor 40, which controls OXC 36 of the node. Processors 40 of the different nodes participate in carrying out channel validation and establishment processes, which are described in detail below. In some embodiments, each node comprises a database 44, which holds information that is used in the channel validation processes. Typically, each node comprises a suitable memory, which holds database 44. Database 44 may comprise any suitable data structure.

The functions of processor 40 may be implemented using software, using suitable hardware, or using a combination of software and hardware elements. In some embodiments, processor 40 comprises a general-purpose processor, which is programmed in software to carry out the functions described herein. The software may be downloaded to the processor in electronic form, over network 20, for example, or it may, alternatively or additionally, be provided and/or stored on tangible media, such as magnetic, optical, or electronic memory.

Single-Channel and Multi-Channel Optical Impairments and Their Effect on Channel Validation A given communication channel, such as channels 32A . . . 32C in FIG. 1, traverses a path having a number of network nodes 24 and network sections 28 before reaching its intended client interface. The optical carrier over which the channel is transmitted traverses multiple optical components, such as fiber sections, optical transceivers, optical amplifiers and OXCs. These optical components introduce various kinds of impairments, which degrade the quality of the optical carrier. This quality can be quantified, for example, by the Optical Signal-to-Noise Ratio (OSNR) of the carrier, as seen by the client interface at the destination node. Typically, the client interface requires a certain minimum OSNR. If the OSNR of the optical carrier falls below this minimum OSNR, the channel cannot deliver its specified performance.

Optical impairments that affect the performance of a given validated channel may comprise, for example, linear impairments such as path loss, optical noise and dispersion accumulation. Impairments may also be caused by non-linear effects in the optical fibers or in other components, such as Self Phase Modulation (SPM) and Four Wave Mixing (FWM).

The optical impairments can also be classified into single-channel and multi-channel impairments. Single-channel impairments can be characterized or modeled using the characteristics of only the validated channel in question and the path it traverses. Such characteristics may comprise, for example, the channel bit rate, wavelength and/or modulation format, and the path's fiber loss, chromatic dispersion and/or amplifier power. These characteristics are typically (although not necessarily) static. As such, single-channel impairments can often be evaluated when the channel is first established, and are not expected to vary considerably over time.

Multi-channel optical impairments, on the other hand, depend not only on the channel and path characteristics of the validated channel in question, but also on other channels whose path is shared, at least partially, with the path of the validated channel. Multi-channel impairments may comprise, for example, non-linear effects in the optical fiber media (e.g., FWM and Cross Phase Modulation—XPM) and non-ideal channel isolation in the OXCs or other node components. Because of multi-channel optical impairments, the performance of a given validated channel can be affected by other channels in the network. By the same token, the given channel may affect the performance of other channels.

Since the layout and configuration of communication channels in network 20 ("the traffic matrix") may change over time, performance effects caused by multi-channel optical impairments may change over time, as well. In particular, a given channel may have a tolerable level of impairments at the time it is established, but this level may become intolerable at a later time due to the addition of other channels to the network. In another scenario, a certain path may be unsuitable for establishing a new channel at a certain time due to interference from existing channels. This path may become usable at a later time, e.g., if some of the interfering channels are taken down or re-routed.

Channel Validation Using Multi-Channel Impairment Evaluation

Embodiments of the present invention provide improved methods and systems for validating and establishing communication channels via optical networks. The methods and systems described herein take into account both single-channel and multi-channel optical impairments. In particular, validation of a proposed optical path for a new channel considers (1) the expected effects of the proposed path on the new channel's performance, (2) the expected effects of existing channels in the network on the new channel's performance, and (3) the expected effects of the new channel on the performance of existing channels.

The channel validation methods described herein use quantities, referred to as optical cross-talk and cross-talk margin, for measuring the level of impairments on a given channel due to the others channels in the network. A given channel is typically specified to operate properly below a certain optical cross-talk value, depending on the properties of the client interface in question. The cross-talk margin of a given channel measures the amount of additional optical cross-talk that can be endured by the channel, in addition to the cross-talk that is already present, without deviating from its specified performance. In other words, the cross-talk margin of a given channel quantifies the amount of additional multi-channel impairments that the channel can tolerate.

In some embodiments, each node 24 in network 20 holds the cross-talk margin of each channel traversing this node. The cross-talk margins are stored in database 44 of the node. In order to take into account multi-channel impairments, nodes 24 use the locally-stored cross-talk margin values to validate proposed paths for new channels in a distributed manner.

Figure 3:
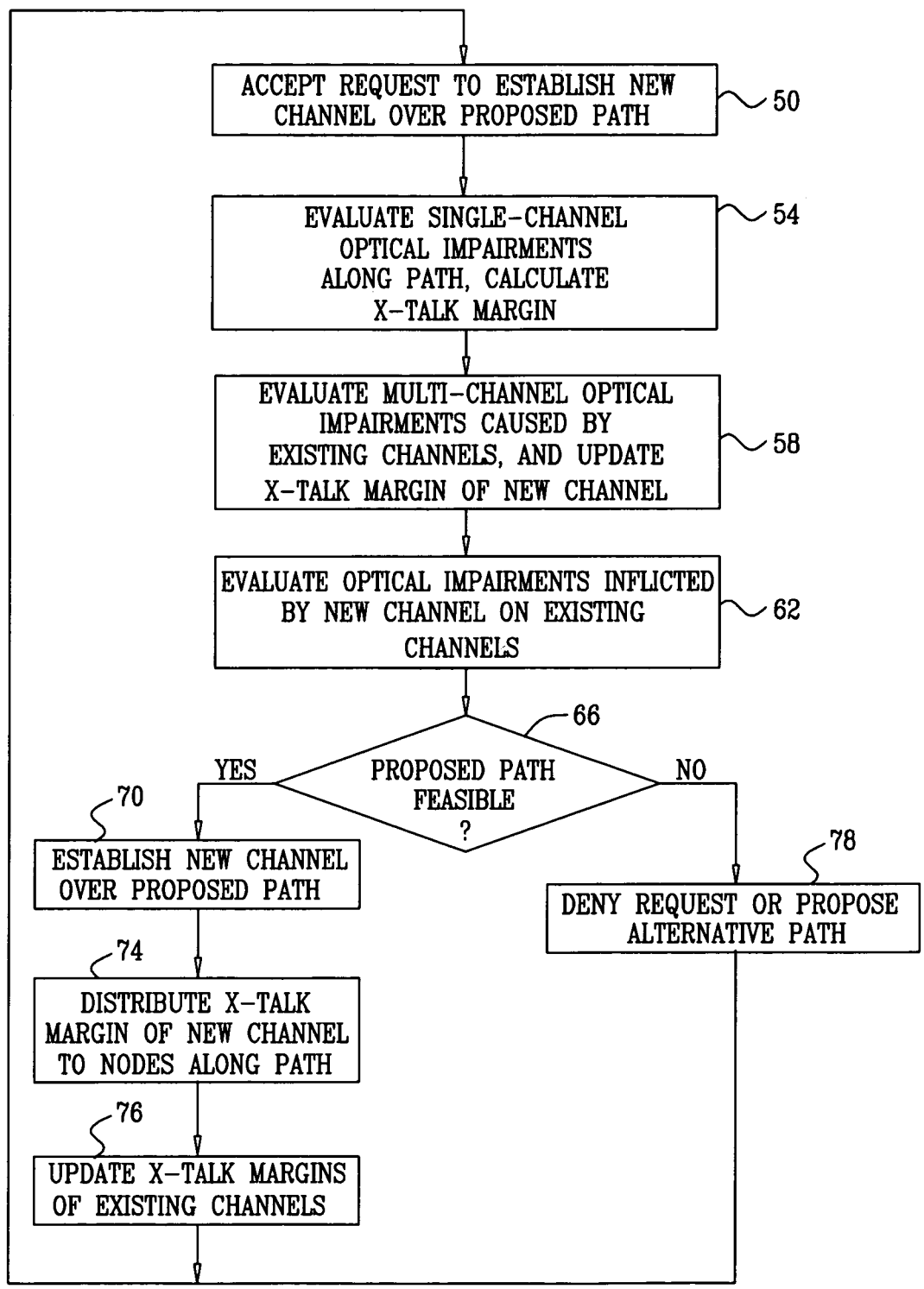
FIGS. 3 and 4 are flow charts that schematically illustrate methods for establishing a communication channel in an optical communication network, in accordance with embodiments of the present invention.

FIG. 3 is a flow chart that schematically illustrates a method for establishing a new communication channel in optical communication network 20, in accordance with an embodiment of the present invention. The method begins with network 20 receiving a request to establish a new channel over a proposed path through the network, at a path requesting step 50. The proposed path enters the network at a certain source node and exits the network at a certain destination node. The request is typically provided to the source node.

The nodes along the proposed path evaluate the single-channel optical impairments along the path, at a single-channel evaluation step 54. Typically, each node along the proposed path evaluates the single-channel impairments contributed by its own components (e.g., OXC) and by the local section 28 connected to the node. The nodes may use any suitable model or formula for assessing the single-channel impairments based on characteristics of the channel, the node and the local section (e.g., amplifier power, span loss, span dispersion, fiber type and length, optical component characteristics, wavelength and/or channel bit rate). Each node sends its evaluation results to the next node along the path, which relays the results onwards toward the destination node. The destination node receives the evaluation results from the different nodes along the path, and calculates the impairment margin of the proposed path based on these results.

In addition, the nodes along the proposed path evaluate the multi-channel optical impairments, which are inflicted on the new channel by existing channels, at a first multi-channel evaluation step 58. Each node along the path considers the existing channels that traverse the node, and evaluates the effect of these channels on the new channel. The nodes may use any suitable model or formula for assessing the multi-channel impairments based on characteristics of the channel, the node and the local section. Each node sends its multi-channel effect evaluation results to the next node along the path, until the results reach the destination node. The destination node updates the cross-talk margin of the proposed path based on the multi-channel effect results.

Each node along the proposed path also evaluates the effect of the new channel on the affected existing channels that traverse the node, at a second multi-channel evaluation step 62. Typically, each node calculates the additional cross-talk that the new channel is expected to inflict on a given existing channel traversing the node. The node then compares the expected accumulated cross-talk to the cross-talk margin of the existing channel, which is stored locally in database 44 of the node. If the expected accumulated cross-talk is smaller than the locally-stored margin of the existing channel, then the impact of the new channel on the existing channel at this node is considered tolerable, and vice versa. Each node along the path informs the destination node whether or not the effect of the new channel on existing channels is acceptable or not.

Note that although steps 54-62 above are described separately and sequentially, this order is chosen purely for the sake of conceptual clarity. Each node may perform the calculations involved in these steps at any desired order and at any suitable time. For example, the nodes may perform the calculations of steps 54-62, and then send all evaluation results together to the destination node. An example of a signaling scheme that carries out these tasks is described in FIG. 4 below.

At this stage, the destination node has sufficient information as to the feasibility of the proposed path, taking into account single-channel effects within the new channel itself, effects of existing channels on the new channel, and effects of the new channel on existing channels. The destination node decides whether or not the proposed path is feasible for establishing the new channel, at a feasibility decision step 66. The proposed path is considered feasible if (1) the cumulative impairment caused by single-channel effects is within the specified performance range of the client interface at the destination node, (2) the cross-talk inflicted on the new channel by existing channels is smaller than the cross-talk margin of the new channel, and (3) the additional cross-talk inflicted by the new channel on any existing channel is smaller than the cross-talk margin of that existing channel.

If the destination node concludes that the proposed path is feasible, the destination node initiates establishment of the new channel over this path, at a path establishment step 70. The destination node distributes the impairment margins of the new channel (which accounts for both single-channel and multi-channel effects) to the nodes along the path, at a distribution step 74. Each node along the path stores the margins of the new channel in its local database 44.

The nodes along the path update the cross-talk margins of the existing channels, at an existing cross-talk margin updating step 76. Each node along the path updates the cross-talk margin of each existing channel traversing the node, using the evaluation results calculated at step 62 above. Additionally, the node initiates a process in which the different nodes along the path of this existing channel update their locally-stored cross-talk margins, as well. As a result, for each existing channel whose path is at least partially shared with the new channel, the cross-talk margins stored in the nodes of the existing channel are updated to take into account the effects of the new channel. An example of a process for updating cross-talk margins is described in FIG. 5 below.

The process of FIG. 3 is carried out when a new channel is to be established. In some embodiments, however, different parts of this process can be carried out under different circumstances, not necessarily related to establishment of a new channel. For example, evaluation of multi-channel impairments (e.g., steps 58 and 62 of FIG. 3) can be implemented at different points in time, e.g., at periodic intervals, in response to a command from an operator or upon detection of a change in the network configuration or traffic properties. In many cases, the evaluation of single channel impairments (step 54 of FIG. 3) needs not be repeated after the channel has been established, since these impairments do not depend on other channels and usually do not change over time.

Example Signaling Schemes

The channel validation process of FIG. 3 is distributed in nature, and involves communication among nodes 24 of network 20. This communication can be carried out using various signaling schemes and protocols. The description that follows presents an example implementation, which can be used for establishing LSPs in MPLS or GMPLS networks. In these network types, resource reservation for network channels is sometimes carried out using the well-known RSVP reservation protocol. RSVP is described, for example, by Braden et al. in IETF RFC 2205, entitled "Resource ReSerVation Protocol (RSVP)—Version 1 Functional Specification," September 1997, which is incorporated herein by reference. The methods of FIGS. 4 and 5 below use the general framework of RSVP, with a possible addition or modification of certain message fields.

Figure 4:
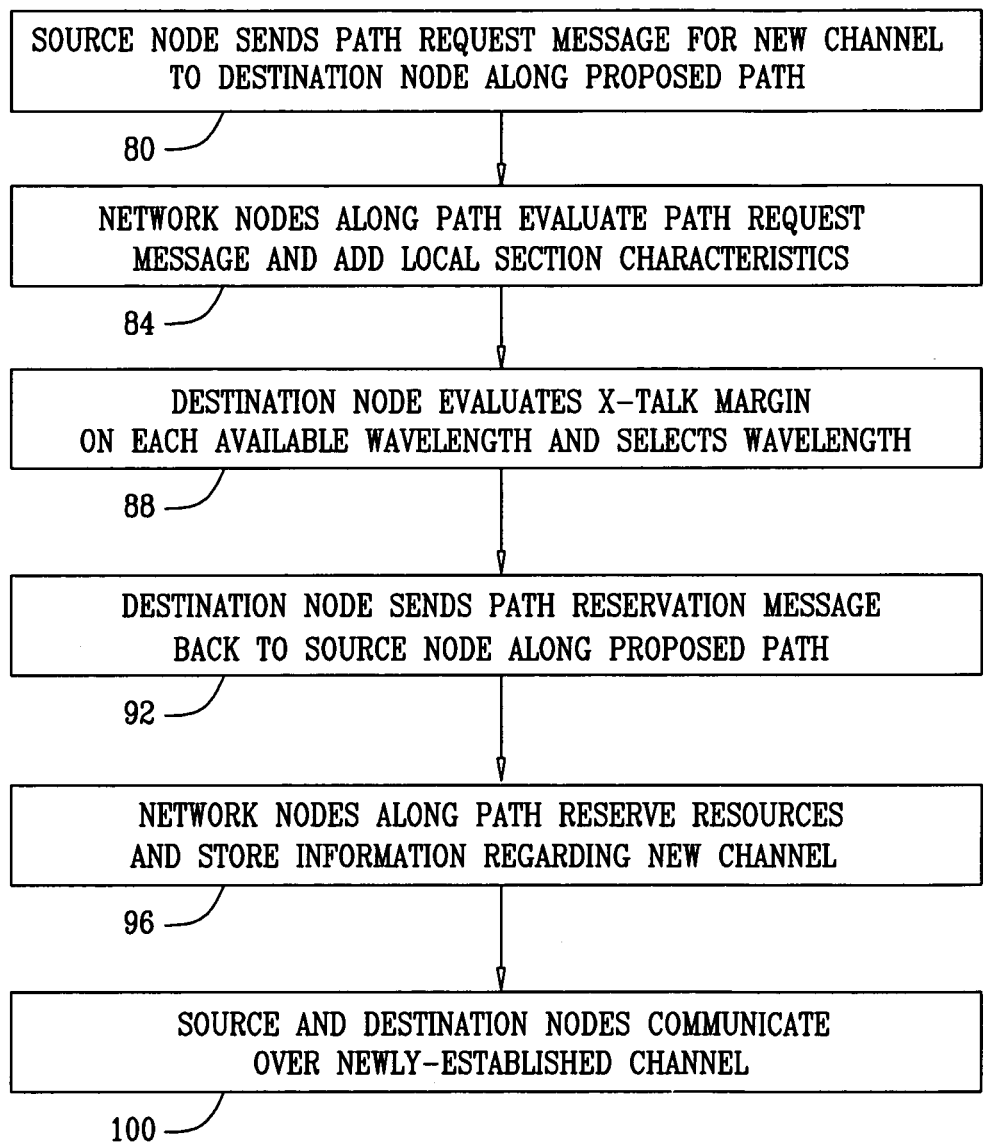

FIG. 4 is a flow chart that schematically illustrates a signaling process for establishing a new LSP through network 20, in accordance with an embodiment of the present invention. FIG. 4 illustrates an example signaling scheme for carrying out the method of FIG. 3 above, in the event that the proposed path is found to be feasible.

The method of FIG. 4 begins with the source node of the new channel sending a path request message to the destination node via the proposed path, at a path request sending step 80. The path request message may comprise, for example, an RSVP PATH message. The network nodes along the proposed path receive and relay the path request message en-route to the destination node, at a request relaying step 84. Each node along the path adds its local section characteristics to the message, so as to provide the destination with sufficient information for computing the cross-talk margin of the channel (see also the description of steps 54-62 of FIG. 3 above). The local section information may comprise, for example, section characteristics (e.g., the section length and fiber type), transmission power of the channel in question over the section and information (e.g., type, power and wavelength) of existing active channels in neighboring optical wavelengths (carriers) on this section.

In some embodiments, the proposed path comprises two or more unused wavelengths, which may be selected for establishing the new channel. (The channel is to be established over the same wavelength throughout the path, but the sections along the path may have several possible wavelengths that are unused end-to-end.) The optical impairments often differ from one wavelength to the other.

The destination node receives the path request message, which now comprises the accumulated characteristics contributed by the different nodes along the path. The destination node evaluates the channel cross-talk margin on each available wavelength and selects a wavelength for the channel, at a wavelength selection step 88. For example, the destination node may select the wavelength having the highest cross-talk margin.

In some embodiments, the destination node computes the total SPM, XPM and FWM on the new channel based on the local section characteristics reported in the path request message. The destination node may calculate the degradation in OSNR margin that is caused by the channel SPM, the degradation of the OSNR margin that is caused by the total accumulated cross-talk, taking into account the reported XPM and FWM, and the resulting cross-talk margin for the particular client interface used.

In some embodiments, the destination node also evaluates the effect of the new channel on existing channel for each wavelength that is available along the proposed path, and selects the wavelength based on the results of this evaluation. For each section of the proposed path, for each wavelength and for each existing channel, the destination node evaluates the residual cross-talk margin of the existing channel, if the new channel were to be established over the wavelength in question. This evaluation is performed using the cross-talk margins of the existing channels that are stored in databases 44 of the nodes along the proposed path.

The effect of the new channel on the existing channel can be evaluated, per section, by evaluating:

The section's additional XPM cross-talk as a function of the properties of the existing channels. Relevant properties of a given existing channel may comprise, for example, the channel type (e.g., bit rate, modulation format or transponder class), the frequency separation of the channel with respect to the new channel, the signal power of the new channel and the residual dispersion to the destination node of the existing channels.

The section's additional FWM cross-talk as a function of, for example, allocation of existing channels in neighboring wavelengths and the signal power of the new channel.

The total additional cross-talk inflicted on an existing channel by the new channel in a given section can be evaluated by summing the section's additional XPM and FWM cross-talk values.

Having selected the appropriate wavelength, the destination node sends a resource reservation message along the path to the source node, at a reservation sending step 92. The reservation message may comprise, for example, an RSVP RESV message. The reservation request message typically specifies the resources (e.g., wavelength and bandwidth) that are to be reserved to the new channel in the nodes and sections along the path. Typically, the reservation message also conveys the cross-talk margin of the new channel, as computed by the destination node. The reservation message may also indicate the type and/or class of the new channel, and/or the total dispersion in the new channel.

The nodes along the path receive the reservation request message and reserve resources accordingly, at a resource reservation step 96. Each node along the path allocates resources for the new channel, as requested in the reservation request message. In particular, each node configures its OXC 36 to route the channel over the selected wavelength. Each node also extracts the cross-talk margin of the channel from the reservation request message, and stores the cross-talk margin in its local database 44, for use in subsequent channel validation processes.

Each node along the path may also evaluate the additional cross-talk inflicted on the existing channels that traverse the node, based on the actual status of the local section. (This value may differ from the value sent in the path reservation message, for example when additional channels have been newly established.) The node stores these newly calculated cross-talk values in its database 44. (When a channel is taken down (or when a channel setup procedure is rolled back due to an error), the nodes along the path of this channel update the cross-talk margins of the existing channels in a similar manner.)

In some embodiments, each node may compute the residual dispersion for the local section, based on the total dispersion value sent by the destination node in the reservation request message and on the dispersion data sent by the source node in the path request message. Each node may also schedule an updating of existing channel status at this point. A typical refresh interval is on the order of 30 seconds, although any other suitable value can be used.

At this point the channel is established, and data can be sent from the source node to the destination node over the newly-established channel, at a communication step 100.

The signaling scheme described above will now be demonstrated with reference to the network configuration of FIG. 1. In FIG. 1, assume that channels 32B and 32C comprise LSPs that are already set-up and operating in network 20. Channel 32A comprises a new channel that is to be established from node 24C to node 24I. As described above, the source node (node 24C) initiates a PATH message toward the destination node (node 24I). As the PATH message traverses the proposed path of channel 32A, the nodes along the path add local section information to the message. For example, node 24B adds local information regarding channels 32B and 32C in section 28C. Node 24D adds local information regarding channel 32B in section 28D. Node 24F adds local information regarding channels 32B and 32C in section 28G.

Destination node 24I returns a RESV message back toward source node 24C. In response to this message, the nodes along the path of channel 32A update the cross-talk margins of the new channel and of the existing channels. In particular, node 24G updates the cross-talk margin of channel 32B regarding section 28G, and sends a refresh message toward node 24J for updating this margin. Node 24G also updates the cross-talk margin of channel 32C regarding this section, and sends a refresh message toward node 24H with the updated margin.

Similarly, node 24F updates the cross-talk margin of channel 32B regarding section 28D, and sends a suitable refresh message toward node 24J. Node 24D updates the cross-talk margin of channel 32B regarding section 28C, and sends a corresponding refresh message toward node 24J. Node 24D also updates the cross-talk margin of channel 32C regarding section 28C, and sends a corresponding refresh message toward node 24H.

Adaptation to Network Configuration Changes

In some embodiments, nodes 24 update the information stored in their local databases 44 in response to changes that occur in the network configuration.

Figure 5:
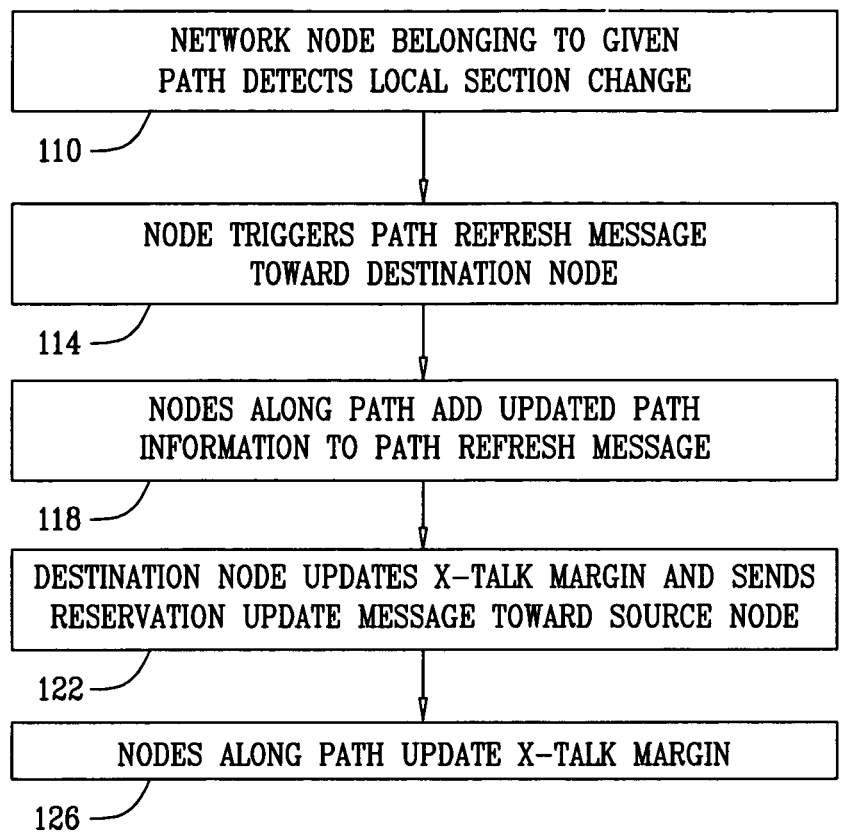
FIG. 5 is a flow chart that schematically illustrates a method for updating information regarding a communication channel in an optical communication network, in accordance with an embodiment of the present invention.

FIG. 5 is a flow chart that schematically illustrates a method for updating information regarding a communication channel, in accordance with an embodiment of the present invention. The method begins with a given node, which belongs to the path of a certain channel, detecting a change in its local section, at a change detecting step 110. The detected change may comprise any type of change in the node and/or the local section 28, which may have an effect on optical impairments. The node in question initiates a PATH REFRESH message toward the destination node, at a path refresh sending step 114. In this message, the node reports the detected change.

The nodes along the path add updated local path information, if applicable, to the path refresh message, and relay the message toward the destination node, at a refresh relaying step 118. The destination node receives the message, and updates the cross-talk margin of the channel using the updated local information sent by the nodes, at a cross-talk updating step 122. The destination node sends a reservation refresh message (e.g., an RSVP RESV REFRESH message) along the path, back to the source node. The reservation refresh message specifies the updated cross-talk margin value. Additionally, the message may update resource allocations of the channel that are to be modified in response to the detected change. For example, the destination node may request that the channel be moved to a different wavelength in response to a certain detected change in the network configuration.

The nodes along the path receive and act upon the reservation refresh message, at a refreshing step 126. In particular, the nodes store the updated cross-talk margin value in their local databases, and may update the resources allocated to the channel, if applicable.

In the embodiments described herein, the relevant information for validating a proposed path for a new channel is propagated toward the destination node of the new channel. The destination node processes the information and determines whether the proposed path is feasible or not. In alternative embodiments, however, the methods and systems described herein can be carried out, mutatis mutandis, by any other network node or group of nodes, such as by the source node of the new channel.

The embodiments described herein mainly refer to cross-talk margin as common measure for evaluating the composite effect of different kinds of impairments. Alternatively, however, the methods and systems described herein can be used with any other suitable type of performance margin.

Although the embodiments described herein mainly address channel and path evaluation in DWDM mesh topologies, the principles of the present invention can also be used in various other network topologies.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method comprising:
in an optical communication network that includes a plurality of interconnected network nodes, storing in each network node one or more cross-talk margins of respective communication channels that traverse the node, each cross-talk margin indicating an amount of additional cross-talk that a corresponding one of the communication channels can tolerate and remain within specified performance criteria;
identifying a potential communication channel that traverses a subset of the nodes in the network; and
determining quality of the potential communication channel by evaluating the cross-talk margins stored in the nodes in the subset,
wherein determining the quality comprises evaluating cross-talk inflicted on the potential communication channel by at least one other communication channel that traverses at least one of the nodes in the subset using the cross-talk margins stored in at least one of the nodes,
wherein determining the quality further comprises evaluating cross-talk inflicted by the potential communication channel on at least one other communication channel that traverses at least one of the nodes in the subset using the cross-talk margins stored in at least one of the nodes.

2. The method according to claim 1, wherein determining the quality comprises assessing a feasibility of establishing the potential communication channel over a proposed optical path.

3. The method according to claim 2, wherein assessing the feasibility comprises selecting an optical wavelength for the potential communication channel over the proposed optical path.

4. The method according to claim 1, and comprising routing traffic over the potential communication channel responsively to the quality meeting the specified performance criteria.

5. A method comprising:
in an optical communication network that includes a plurality of interconnected network nodes, storing in each network node one or more cross-talk margins of respective communication channels that traverse the node, each cross-talk margin indicating an amount of additional cross-talk that a corresponding one of the communication channels can tolerate and remain within specified performance criteria;
identifying a potential communication channel that traverses a subset of the nodes in the network; and
determining quality of the potential communication channel by evaluating the cross-talk margins stored in the nodes in the subset,
wherein the network nodes are interconnected by network sections, and wherein determining the quality comprises collecting from each node in the subset characteristics of a respective local network section connected to the node, and estimating the cross-talk margin of the potential communication channel using the collected characteristics.

6. The method according to claim 5, wherein the nodes in the subset are arranged along a path that traverses the optical communication network from a source node to a destination node, and wherein collecting the characteristics comprises propagating a path request message from the source node to the destination node via the nodes in the subset, and adding the respective characteristics to the path request message by each of the nodes in the subset, so as to accumulate the characteristics and estimate the cross-talk margin at the destination node.

7. The method according to claim 6, and comprising propagating a path reservation message, which comprises the estimated cross-talk margin of the potential communication channel, from the destination node to the source node via the nodes in the subset, and updating the cross-talk margin of the potential communication channel stored in each of the nodes in the subset responsively to the path reservation message.

8. The method according to claim 7, and comprising, in a given node in the subset, updating the stored crosstalk margins of one or more other communication channels that traverse the given node in response to the path reservation message.

9. The method according to claim 8, and comprising causing the network nodes traversed by the one or more other communication channels to update the stored crosstalk margins of the one or more other communication channels.

10. The method according to claim 5, wherein collecting the characteristics comprises detecting by one of the nodes in the subset a change related to the respective local network section, and updating the collected characteristics and re-estimating the cross-talk margin of the potential communication channel responsively to the detected change.

11. An optical communication network comprising:
a plurality of interconnected network nodes,
a database at each network node to store one or more cross-talk margins of respective communication channels that traverse the node, each cross-talk margin indicating an amount of additional cross-talk that a corresponding one of the communication channels can tolerate and remain within specified performance criteria; and a processor configured to determine quality of a potential communication channel that traverses a subset of the nodes in the network by evaluating the cross-talk margins stored in the databases in the nodes in the subset, wherein the processor is configured to determine the quality by evaluating cross-talk inflicted on the potential communication channel by at least one other communication channel that traverses at least one of the nodes in the subset using the crosstalk margins stored in the database of at least one of the nodes, wherein the processor is further configured to determine the quality by evaluating cross-talk inflicted by the potential communication channel on at least one other communication channel that traverses at least one of the nodes in the subset using the crosstalk margins stored in the database of at least one of the nodes.

12. The network according to claim 11, wherein the processor is configured to assess a feasibility of establishing the potential communication channel over a proposed optical path.

13. The network according to claim 12, wherein the processor is configured to select an optical wavelength for the potential communication channel over the proposed optical path.

14. The network according to claim 11, wherein the subset is coupled to route traffic over the potential communication channel responsively to the quality meeting the specified performance criteria.

15. An optical communication network comprising:
a plurality of interconnected network nodes,
a database at each network node to store one or more cross-talk margins of respective communication channels that traverse the node, each cross-talk margin indicating an amount of additional cross-talk that a corresponding one of the communication channels can tolerate and remain within specified performance criteria; and
a processor configured to determine quality of a potential communication channel that traverses a subset of the nodes in the network by evaluating the cross-talk margins stored in the databases in the nodes in the subset,
wherein the network nodes are interconnected by network sections, and the processor is configured to collect from each node in the subset characteristics of a respective local network section connected to the node, and to estimate the cross-talk margin of the potential communication channel using the collected characteristics.

16. The network according to claim 15, wherein the nodes in the subset are arranged along a path that traverses the optical communication network from a source node to a destination node, wherein the source node transmits a path request message to the destination node via the nodes in the subset, and wherein the processor is configured to add the characteristics of the respective local network section to the path request message, the cross-talk margin at the destination node being estimated from an accumulation of the characteristics added at each of the nodes.

17. The network according to claim 16, wherein the processor is configured to transmit a path reservation message to the source node via the nodes in the subset, the path reservation message including the estimated cross-talk margin of the potential communication channel, and wherein the processor is configured to update the cross-talk margin of the potential communication channel in the corresponding database responsively to the path reservation message.

18. The network according to claim 17, wherein the processor is configured to update the crosstalk margins stored in the database of the given node of one or more other communication channels that traverse the given node in response to the path reservation message.

19. The network according to claim 18, wherein the processor is configured to cause the network nodes traversed by the one or more other communication channels to update the cross-talk margins of the one or more other communication channels stored in the databases thereof.

20. The network according to claim 15, wherein the processor, responsive to detecting a change related to the respective local network section, is configured to cause an update of the collected characteristics and a re-estimation of the cross-talk margin of the potential communication channel.

21. A node in an optical communication network, the node comprising:
a memory to store one or more cross-talk margins of respective communication channels that traverse the node, each cross-talk margin indicating an amount of additional cross-talk that a corresponding one of the communication channels can tolerate and remain within specified performance criteria; and
a processor configured to communicate with other nodes along a path in the network and to determine quality of a potential communication channel that traverses the other nodes, by evaluating cross-talk inflicted on the potential communication channel by at least one other communication channel that traverses at least one of the other nodes using the crosstalk margins stored in the database of at least one of the other nodes,
wherein the processor is further configured to determine the quality by evaluating cross-talk inflicted by the potential communication channel on at least one other communication channel that traverses at least one of the other nodes using the crosstalk margins stored in the database of at least one of the other nodes.

22. A node in an optical communication network, the node comprising:
a memory to store one or more cross-talk margins of respective communication channels that traverse the node, each cross-talk margin indicating an amount of additional cross-talk that a corresponding one of the communication channels can tolerate and remain within specified performance criteria; and
a processor configured to communicate with other nodes along a path in the network and to determine quality of a potential communication channel that traverses the other nodes, by evaluating the cross-talk margins stored in the other nodes,
wherein the node is interconnected to the other nodes by network sections, and the processor is configured to collect from the other nodes characteristics of a respective local network section connected to the node, and to estimate the cross-talk margin of the potential communication channel using the collected characteristics.

* * * * *